United States Patent

Foster et al.

[15] 3,653,870
[45] Apr. 4, 1972

[54] HOLDING AND COOLING DEVICE FOR GLASSWARE MOLDS

[72] Inventors: Thomas V. Foster, Oberengstringen; Herman H. Nebelung, Binz-Maur, both of Switzerland

[73] Assignee: Emhart Corporation, Bloomfield, Conn.

[22] Filed: Mar. 9, 1970

[21] Appl. No.: 17,562

[52] U.S. Cl. ................................. 65/356, 65/265, 65/83, 65/319
[51] Int. Cl. .......................................... C03b 9/38
[58] Field of Search ..................... 65/356, 355, 319, 265, 83

[56] References Cited

UNITED STATES PATENTS

| 2,402,475 | 6/1946 | Waterbury et al. | 65/355 |
| 3,137,560 | 6/1964 | Ketcham | 65/356 |
| 3,133,807 | 5/1964 | Denman et al. | 65/356 |
| 3,024,571 | 3/1962 | Abbott et al. | 65/356 X |
| 2,751,715 | 6/1956 | Denman | 65/356 |
| 3,445,219 | 5/1969 | Cook | 65/355 X |
| 2,485,836 | 10/1949 | MacConnell, Jr. | 65/356 |

*Primary Examiner*—Frank W. Miga
*Attorney*—McCormick, Paulding & Huber

[57] ABSTRACT

A holding and cooling device for glassware molds, particularly for one-piece inverted parison body molds for wide mouth ware. The holder has an internal passage for cooling air, a portion of which passage surrounds the associated mold or molds, and ports from the passage are directed to the molds which have vertical ribs and interspersed flutes. The molds are rotatably adjustably positioned in vertical openings in the holder, and such adjustment positions the ribs to close off selected ports while leaving the remaining ports open for the flow of cooling air into the flutes on the mold.

8 Claims, 5 Drawing Figures

Patented April 4, 1972
3,653,870
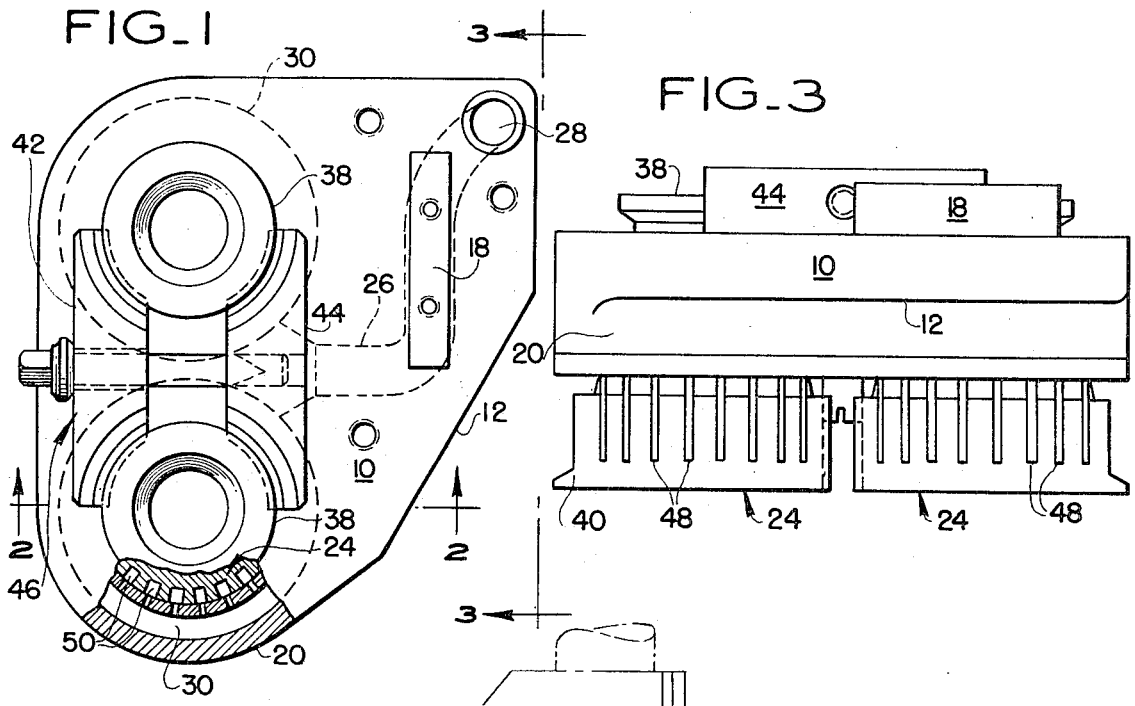
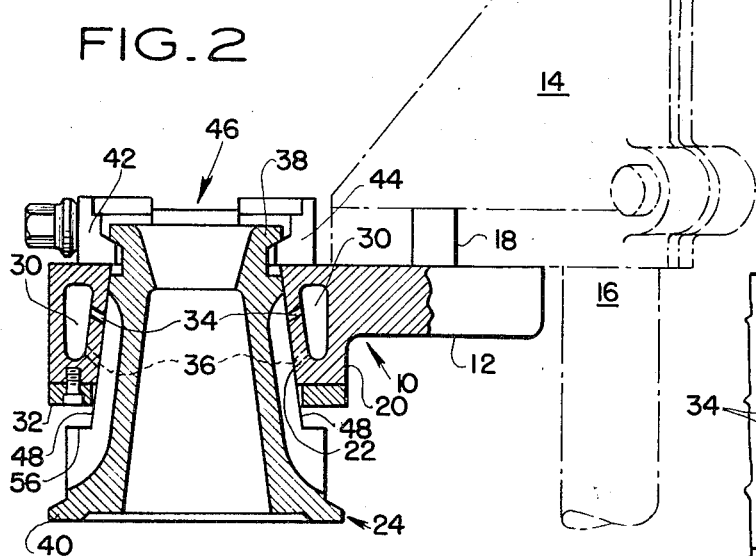
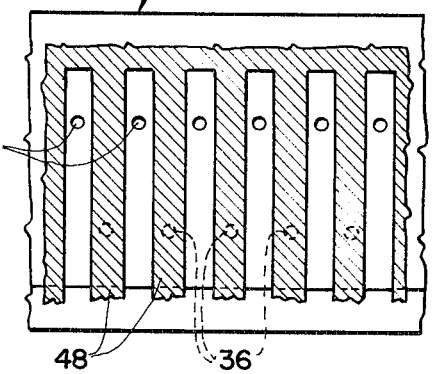
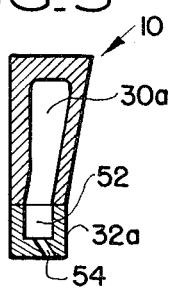
INVENTORS
THOMAS V. FOSTER
HERMANN H. NEBELUNG
BY McCormick, Paulding & Huber
ATTORNEYS

HOLDING AND COOLING DEVICE FOR GLASSWARE MOLDS

BACKGROUND OF THE INVENTION

The field of the invention is in the glassware forming machine art and particularly that portion thereof relating to the mold holding and cooling constructions for the molds utilized in the forming machines.

There is a continuous problem of controlled cooling of the molds in forming machines for the production of high quality glassware. As is well known, the ware is formed in two steps from a gob of molten glass, first into a parison either by pressing or blowing in a blank or parison mold, and then into final shape in a blow mold. The controlled cooling problem is more acute in the first step. The present invention relates to the construction of a holder and associated parison molds for making wide mouth ware with one-piece body molds so that there will be no vertical seams on the parisons and finished glassware.

Heretofore, the holders of one-piece parison molds have mounted some form of conduit and nozzle means for directing cooling air onto the molds. Since the cooling requirements for any particular mold may change from time to time, and since the cooling requirements for different molds for different glassware used in the holder are generally quite different, the nozzle elements associated with the mold holder are generally replaceable, but considerable time may be lost in making such replacement. For example, the Abbot et al. U.S. Pat. No. 3,024,571, illustrates the use of a sleeve surrounding a mold when in a holder, the sleeve being provided with a plurality of nozzle openings for directing the cooling air as desired onto the mold. Whenever there is to be a change made in the cooling requirements, the sleeve must be replaced.

SUMMARY OF THE INVENTION

In accordance with the present invention, a mold holder is provided with an internal passage for cooling air or other cooling fluid, a portion of the passage being arranged around the associated mold or molds and being provided with a plurality of ports or orifices for directing the cooling fluid onto the mold. These ports are permanent in the mold holder, but they are used selectively. That is, each mold associated with a holder is provided with a circumferential series of vertical ribs, and each mold is rotatably adjustably mounted in the holder for movement around its vertical axis so that the ribs can be positioned to close off selected ports or orifices while leaving the remaining ports or orifices open to direct the cooling air as desired onto the mold.

Accordingly, adjustment for selected and controlled cooling of the molds is effected by positioning of the molds during a mold change, or afterwards if desired, at very little effort and at substantially no loss of time. Therefore, it can be said that it is the general object of the present invention to provide a mold holder and cooling construction which is readily adaptable and efficient in adjustment for controlled cooling of a variety of molds.

DESCRIPTION OF THE DRAWING

FIG. 1 is a plan view of a mold holder provided in accordance with this invention to accommodate a pair of one-piece parison body molds which are shown in assembly on the holder.

FIG. 2 is a vertical cross-sectional view take through the holder and one of the molds as indicated generally by the line 2—2 in FIG. 1, FIG. 2 also showing in phantom the bracket upon which the mold holder is supported.

FIG. 3 is an elevational view of the mold holder and its molds, taken as indicated by the line 3—3 on FIG. 1.

FIG. 4 is a schematic illustration of the manner in which the mold ribs are arranged relative to the cooling ports in the mold holder.

FIG. 5 is a vertical cross-sectional view taken through a portion of a mold holder showing an alternative construction.

DESCRIPTION OF THE PREFERRED EMBODIMENTS

As seen in FIGS. 1, 2 and 3, the mold holder 10 comprises a flat top plate having a relatively thin flange portion 12 for securing the holder to a bracket 14 (FIG. 2) which is mounted on a shaft 16 for vertical movement in raising and lowering the holder as a part of the timed operation in a glassware forming machine. A vertically upwardly projecting rectangular boss 18 is formed on the holder flange 12 to facilitate the mounting of the holder 10 on the bracket 14 in such way as to provide limited relative adjustability.

The holder 10 also includes a relatively thicker portion 20 wherein a pair of vertical mold openings is formed such as the mold opening 22 (FIG. 2). These vertical mold openings are tapered, being of frusto-conical shape with the smaller diameter end of the opening at the top of the holder 10. Each such opening receives a complementary shaped mold such as indicated generally by the reference number 24.

The mold holder 10 has formed therein a passage 26 having an inlet 28 which is connectable with a pressurized source of cooling fluid, such as air. A portion 30 of the cooling passage 26 is arcuately formed to surround each mold opening 22 in spaced relationship, each such portion 30 preferably being completely annular so as to surround fully the associated mold opening. In forming the arcuate or annular portion 30 of the cooling passage 26, particularly in a casting technique, it may be desirable to have molten metal runner passages extending through the thick portion 20 of the holder 10, and these passages may thereafter be closed by an annular plate or ring 32 secured to the mold holder as by machine screws or the like.

The arcuate or annular portions 30 are provided to direct cooling air into the associated mold openings 22, and in keeping with this invention, there are a plurality of ports 34, 34 and 36, 36 provided in the wall of each mold opening 22 to extend into the associated arcuate or annular portion 30 of the air passage 26. The ports 34 and 36 can be arranged in a wide variety of spaced relationships as desired, but preferably the ports 34 are arranged in an evenly spaced apart horizontal series around each mold opening 22 and the ports 36, 36 are arranged in a lower horizontal evenly spaced series around the mold opening, the ports 36 in the lower series being in staggered relationship to the ports 34 in the upper series for a purpose which will become apparent hereinafter.

Each mold 24 which is shown comprises a one-piece parison body mold for the making of wide mouth parisons. Each such mold is shown supported by the holder 10 in an inverted position, i.e., with its wide diameter end or mouth down. Each mold 24 is formed so that its smaller diameter upper end 38 will project well above the smaller diameter end of the associated opening 22 and so its larger diameter lower end will project well below the said opening when the mold is engaged in its opening as shown in FIG. 2. The upper end 38 of each mold is flanged and provided with an underside taper as shown to receive the tapered jaws 42 and 44 of a two-jaw, vise-like screw operated clamp indicated generally by the reference number 46. As seen in FIG. 1, the jaws 42, 44 of the clamp 46 engage the flanged upper ends 38, 38 of both molds 24, 24. The tapers on the upper ends of the molds and on the clamp jaws are so formed that when the clamp jaws are drawn toward each other by the clamp screw, the molds are drawn upwardly in the mold openings 22, 22 of the holder 10 to force the frusto-conically shaped molds into tight engagement with the walls of the similarly shaped openings.

The lower ends 40 of the molds are also flanged but this is to facilitate engagement of the molds with a neck ring mold (not shown), and this forms no part of the present invention. However, an important part of the present invention resides in forming a circumferential series of spaced apart ribs 48, 48 on each mold. These ribs are preferably evenly spaced apart to define vertical flutes 50, 50 (FIG. 1) therebetween. These ribs extend downwardly on each mold into the neck flange area 40, but they do not extend upwardly so as to project above the mold holder 10.

The ribs 48, 48 are formed on the mold 24 so that they can be positioned selectively as illustrated in FIG. 4 to close certain of the ports 34 and 36 while leaving the remaining ports open for the flow of air into the mold flutes 50, 50. In the preferred example shown, the ribs are so spaced apart on the mold that they can cover selectively all of the ports 34, 34 in the upper series while leaving the ports 36, 36 open in the lower series or vice versa as shown. This selection of ports is, of course, achieved by selecting a rotative position of each mold 24 in its associated holder opening 22. That is, with the clamp 46 loosened, each mold 24 can be rotated on its vertical axis as desired to a selected adjusted position before the clamp is closed. Obviously, the adjusted position of one mold in the holder is quite independent from the adjusted position of the other mold in the holder.

In the forming of some glassware, it may be found more desirable to have the upper series of ports 34, 34 open for the flow of cooling fluid and the lower series of ports 36, 36 closed. In the making of other articles of glassware it may be desirable to close the upper ports 34, 34 while opening the lower ports 36, 36. In making still other forms of glassware it may be desirable to have cooling air ports open to an even lower portion of the inverted mold while upper ports may remain open or are closed. That is, it may be desirable to direct cooling air into the neck ring area at the lower end portion of the inverted mold. The modification shown in FIG. 5 is particularly adapted to provide a cooling air stream onto the lower end portion of the inverted mold.

That is, in the modified form of FIG. 5, the arcuate or annular portion of the air passage 26 associated with each mold is open at the bottom, the said annular portion in the modified form being designated by the reference number 30a. A modified bottom plate or ring 32a is associated with the holder 10 and is made to extend downwardly farther toward the bottom of the mold. The ring 32a is provided with a channel 52 in communication with the annular passage 30a, and a series of downwardly directed ports 54 is provided at the bottom of the channel. The bottom of the plate or ring 32a will rest upon the shoulders 56, 56 of the ribs 48, 48 so that the ports 54, 54 can be selectively closed thereby upon desired rotation and location of the mold. When the ports 54, 54 are left open, cooling air is directed from the passage 26 into intimate contact with the lower end of the inverted mold adjacent the associated neck ring.

We claim:

1. A mold and mold holder construction for a glassware forming machine comprising a mold holder having at least one vertical opening to receive a mold, said holder being provided with an internal integrally formed passage connectible with a pressurized source of cooling fluid and the passage having an arcuate portion extending around said opening with spaced ports communicating with the opening, a one-piece body mold for an article of glassware disposed for rotatably slidable adjustment in the vertical opening of the holder and having circumferentially spaced vertical ribs to engage the wall of said opening and to close off selected ports while leaving the other ports open for communication with the vertical flutes between the ribs in rotatably adjusted positions of the mold in said opening, and means engageable with the mold for securing the mold to the holder in selected adjusted positions in said opening.

2. A mold and holder construction as defined in claim 1 wherein said ports are arranged in at least two vertically spaced apart series with the ports in each series evenly spaced from each other but in staggered relationship to the ports in the other series, whereby selected rotated adjustment of the mold in the opening will open the ports in one series while closing the ports in the other series.

3. The construction set forth in claim 2 wherein the arcuate portion of the passage is annular so as to extend wholly around the opening.

4. A mold and holder as defined in claim 1 wherein there are a plurality of such vertical openings provided for a plurality of said molds, and the holder passage has a plurality of said arcuate positions, each of which extends around a respective one of said openings.

5. A mold and holder as defined in claim 1 wherein the vertical mold-receiving opening in the holder is of tapered frusto-conical shape and the mold is of complementary frusto-conical shape and projects beyond both ends of the opening when the ribs engage the walls thereof, and wherein the means for securing the mold to the holder comprises a clamp engaging the portion of the mold projecting from the smaller diameter end of the said opening.

6. The construction set forth in claim 5 wherein the ribs and associated flutes on the mold are formed so as not to project beyond the smaller diameter end of the opening but to project beyond the larger diameter end of the opening.

7. The construction of claim 5 particularly adapted for forming a wide mouth glassware parison in an inverted mold wherein the larger diameter ends of the opening and complementary mold face downwardly, the top of the holder adjacent the opening is flat, the projecting upper end portion of the mold has a flange, and the said clamp is slidable on said top of the holder to engage the said mold flange.

8. A construction as defined in claim 6 wherein there are a plurality of such openings in the holder and a plurality of such complementary molds and the construction is particularly adapted for forming wide mouth parisons in inverted molds wherein the larger diameter ends of the openings and complementary molds face downwardly, the top of the holder adjacent the openings is flat, the projecting upper end portion of each mold has a flange, and a single clamp is slidable on said top of the holder to engage all of the said mold flanges.

* * * * *